United States Patent

Maeda et al.

[11] Patent Number: 6,051,677
[45] Date of Patent: Apr. 18, 2000

[54] GAS SEPARATING MEMBRANE HAVING A POLYCARBODIIMIDE RESIN LAYER

[75] Inventors: Masatoshi Maeda; Masahiro Yoshioka; Takahiro Fukuoka; Michie Sakamoto; Amane Mochizuki, all of Osaka, Japan

[73] Assignee: Nitto Denko Corporation, Osaka, Japan

[21] Appl. No.: 09/135,558

[22] Filed: Aug. 18, 1998

[30] Foreign Application Priority Data

Aug. 19, 1997 [JP] Japan ................................. 9-265192

[51] Int. Cl.[7] .......................... C08G 73/10; B01D 39/00
[52] U.S. Cl. ..................... 528/310; 528/170; 528/220; 528/229; 528/322; 528/353; 428/411.1; 428/473.5; 210/500.21; 210/500.27; 210/500.39
[58] Field of Search ................................. 528/170, 310, 528/322, 220, 229, 353; 428/473.5, 411.1; 210/500.27, 500.21, 500.39

[56] References Cited

U.S. PATENT DOCUMENTS

| | | | |
|---|---|---|---|
| 4,806,189 | 2/1989 | Kraus et al. | 156/155 |
| 5,859,170 | 1/1999 | Sakamoto et al. | 528/170 |

OTHER PUBLICATIONS

Journal of Applied Polymer Science, vol. 21, 1977, pp. 1999–2008, "Preparation and Properties of Polycarbodiimides", L. M. Alberino et al.

Stanford Research Institute, Apr. 1963, pp. 1–9, "Polycarbodiimides and their Derivatives", Donald J. Lyman et al.

Primary Examiner—P. Hampton-Hightower
Attorney, Agent, or Firm—Sughrue, Mion, Zinn, Macpeak & Seas, PLLC

[57] ABSTRACT

Disclosed is a gas separating membrane comprising a layer made of a polycarbodiimide resin having repeating units represented by formula (I):

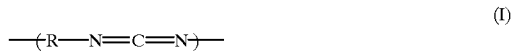

(I)

wherein R represents a divalent organic group. The gas separating membrane available according to the present invention has high permeability and separation selectivity as well as excellent permeating performance, and further has excellent heat resistance, chemical resistance and durability.

5 Claims, No Drawings

GAS SEPARATING MEMBRANE HAVING A POLYCARBODIIMIDE RESIN LAYER

FIELD OF THE INVENTION

This invention relates to a gas separating membrane which has a polycarbodiimide resin layer and is therefore excellent in permeating performance. The gas separating layer according to the present invention is not only excellent in selective permeating performance but also good in heat resistance, chemical resistance and durability. The separating membrane according to the present invention is used for, for example, separation and recovery of hydrogen upon synthesis of ammonia, recovery of carbon dioxide or removal of sulfur oxides and nitrogen oxides from a waste gas emitted from a thermal power plant or a refuse incinerator, recovery of carbon oxide from an off gas of an oil field, removal of hydrogen sulfide or carbon dioxide or separation of helium from a natural gas, recovery of gasoline leaked from a gasoline supply station, separation and recovery of a hydrocarbon mixture, pervaporation and separation of a liquid mixture of a volatile substance, removal of a vapor dissolved in a liquid, or separation of oxygen and nitrogen from the air.

BACKGROUND OF THE INVENTION

Gas separation through a membrane is useful in various fields because it does not require much energy for the separation compared with other methods. Conventionally, as such a gas separating membrane, a cellulose acetate Membrane is well known. The cellulose acetate membrane, however, has poor chemical resistance and heat resistance so that it does not always have sufficient performance in practical applications. As a separating membrane having higher heat resistance, a polysulfone semi-permeable membrane has been produced on an industrial scale, which however is not sufficient in permeating performance. As a permselective membrane for oxygen, a silicone membrane is known but it has not yet attained a sufficient mechanical strength so that its products satisfactory from the industrial viewpoint have not been available yet. Recently, studies on a separating membrane obtained using a polyimide resin excellent in not only strength and heat resistance but also gas selective permeability has been made intensively. Such a gas separating membrane or composite membrane made of a polyimide resin is also insufficient for practical use from the viewpoints of permeable speed and selective separativity.

As another heat resistant resin, a polycarbodiimide resin synthesized from an organic diisocyanate is known. This resin becomes insoluble or infusible upon preparation and its molecular weight cannot be controlled easily, which makes it difficult to prepare a homogeneous and tough membrane. A practically usable gas separating membrane has not therefore been available now from such a resin.

SUMMARY OF THE INVENTION

An object of the present invention is to provide a gas separating membrane which has excellent permeating performance (i.e., high permeability)- and separation selectivity, and further has excellent heat resistance, chemical resistance and durability.

With a view to overcoming the above-describe drawbacks of the known gas separating membranes, the present inventors have conducted an extensive investigation on a polycarbodiimide resin membrane. As a result, it has been found that the use of a polycarbodiimide resin having specific repeating units makes it possible to prepare a gas separating membrane which has properties superior to those of the conventional separating membranes such as polyimide-resin separating membrane in gas selective permeability. The present inventors added a further improvement, thereby completing a gas separating membrane having physical and chemical properties, for example, mechanical strength, heat resistance, chemical resistance and durability sufficient for practical use.

In an aspect of the present invention, there is thus provided a gas separating membrane comprising a layer composed of a polycarbodiimide resin which has repeating units represented by the following formula (I):

(I)

wherein R represents a divalent organic group. The separating membrane according to the present invention is preferred to have as an active separating layer a polycarbodiimide resin layer on a porous substrate layer.

DETAILED DESCRIPTION OF THE INVENTION

The gas separating membrane according to the present invention will next be described more specifically.

The gas separating membrane according to the present invention comprises a layer composed of a polycarbodiimide resin having repeating units represented by the following formula (I):

(I)

wherein R represents a divalent organic group.

Examples of an organic diamine which is a raw material diamine for the polycarbodiimide resin used in the present invention and forms a divalent organic group in the structure of the polycarbodiimide resin (i.e., the moiety excluding two amino groups from each organic diamine corresponds to a divalent organic group R in formula (I)) include m- and p-xylene-7,8-diamines, 1,4-bis(2-ethylamine)benzene, 1,3- and 1,4-bis(isopropylamine)benzenes, 1,3-diphenylpropane-1,3-diamine, 1,4- and 1,5-bis(methylamine)naphthalenes, bis[4-(methylamine)phenyl]ether, 4,4'-(3-propylamine)biphenyl, 9,10-bis(methylamine)anthracene, bis(2-ethylamine)tere- and isophthalic acids, bis(2-ethylamine)-p-phenylene diacetate, toluene-4,7-diamine, ethylbenzene-4,7- and 4,8-diamines, propylbenzene-3,9- and 4,9-diamines, butylbenzene-3,9- and 4,9-diamines, tetrahydronaphthalene-1,5-diamine, hexahydrobenzidine-4,4'-diamine, toluene-1,3- and 1,4-diamines, toluene-2,4-, 2,6-, 2,5- and 3,5-diamines, ethylbenzene-2,4-diamine, isopropylbenzene-2,4-diamine, m-xylene-2,4- and 4,6-diamines, p-xylene-2,5-diamine, diethylbenzenediamine, diisopropylbenzenediamine, 3,5-diethyltoluene-2,4-diamine, 1,5-diethyl-3-methylbenzene-2,4-diamine, 1,3, 5-triethylbenzene-2,4-diamine, 1-trifluoromethyl benzene-3,4-diamine, 1-chlorobenzene-2,4-diamine, 1,3-dichlorobenzene-2,4-diamine, 1,5-dichlorobenzene-2,4-diamine, 5-bromotoluene-2,4-diamine, 1-trifluoromethyl benzene-2,4-diamine, 2,5-dichlorobenzene-1,4-diamine, 2-trifluoromethyl benzene-1,4-diamine, 6-bromo-2-methylbenzene-1,4-diamine, 1-nitrobenzene-2,4-diamine, 2-nitrobenzene-1,4-diamine, 1,3,5-triisopropylbenzene-2,4-diamine, 2,6-dimethylbenzene-1,4-diamine, 2,6-diethylbenzene-1,4-diamine, 1-methoxybenzene-2,4-diamine, 1-ethoxybenzene-2,4-diamine, 1,5-dimethoxybenzene-2,4-diamine, 1-propcxybenzene-2,4-diamine, 1-isobutoxybenzene-2,4-diamine, 2-methcxybenzene-1,4-diamine, 2,5-dimethoxybenzene-1,4-diamine, 2,5-diethoxybenzene-1,4-diamine, 1,4-naphthalenediamine, 1,5-naphthalenediamine, 1-methylnaphthalene-1,5-diamine, 2,6-naphthalenediamine, 2,7-naphthalenediamine, 1,1'-dinaphthyl-2,2'-diamine, biphenyl-2,4'-diamine, biphenyl-4,4'-diamine, 3,3'-dimethylbiphenyl-4,4'-diamine, 3,3'-dimethoxybiphenyl-4,4'-diamine, 2-nitrobiphenyl-4,4'-diamine, diphenylmethane-4,4'-diamine, diphenylmethane-2,2 '-diamine, diphenylmethane-2,4'-diamine, 3,3'-dichlorodiphenylmethane-4,4'-diamine, 3,5-dimethyldiphenylmethane-4, 4'-diamine, 2,2'-dimethyldiphenylmethane-4,4'-diamine, 3,3'-dimethyldiphenylmethane-4,4'-diamine, 3-methoxydipheiylmethane-4,4'-diamine, 2,4,6-trimethyldiphenylmethane-3,4'-diamine, 2,2'5,5'-tetramethyldiphenylmethane-4,4'-diamine, 3,3'-dimethoxydiphenylmethane-4,4'-diamine, 4,4-dimethoxydiphenylmethane-3,3'-diamine, 4,4'-diethoxydiphenylmethane-3,3'-diamine, 2,2 '-dimethyl-5,5'-dimethoxydiphenylmethane-4,4'-diamine, 3,3',5,5'-tetraisopropyldiphenylmethane-4,4'-diamine, bis(4-phenylamine)dimethylmethane, bis(3-chlorophenyl-4-amine)dimethylmethane, bis(4-phenylamine)ditrifluoromethylmethane, bis(4-phenylamine)cyclohexylmethane, bis(4-phenylamine)-2-nitrophenylmethane, bis(4-phenylamine)-4-nitrophenylmethane, bis(2,5-dimethylphenyl-4-amine)phenylmethane, bibenzyl-4,4'-diamine, bibenzyl-2,4'-diamine, bis(4-phenylamine)ethylene, bis(4-phenylamine)difluoroethylene, 2,7-fluorenediamine, 2,6-anthraquinonediamine, 3,8-pyrenediamine, 2,8-chrysenediamine, diphenylether-2,4'-diamine, diphenylether-4,4'-diamine, ethyleneglycoldiphenylether-4,4'-diamine, 1,3-propyleneglycoldiphenylether)-4,4'-diamine, diethyleneglycoldiphenylether-4,4'-diamine, azodiphenyl-4,4'-diamine, 3-methylazodiphenyl-4,4'-diamine, 4-phenylarineazo-4'-naphthylamine, diphenylsulfide-2,4'-diamine, diphenylsulfide-4,4'-diamine, 2,2'-dimethylphenyldisulfide-5,5'-diamnine, 3,3'-dimethyldiphenyldisulfide-6,6'-diamine, 4,4'-dimethyldiphenyldisulfide-5,5'-diamine, 4,4'-dimethyldiphenyldisulfide-3,3'-diamine, 3,3'-dimethoxydiphenyldisulfide-4,4'-diamine,diphenylsulfone-4,4'-diamine, diphenylsulfone-3,3'-diamine, 4,4'-dichlorodiphenylsulfone-3,3'-diamine, 4,4'-dimethyldiphenylsulfone-3,3'-diamine, 4,4'-dimethoxydiphenylsulfone-3,3'-diamine, 4,4'-di-tert-butyldiphenylsulfone-3,3'-diamine, 4-methyldiphenvlsulfone-2,4'-diamine, 2,5-di(methylamine)furan, 2,7-dibenzofurandiamine, 3,6-carbazolediamine, 9-ethylcarbazole-3,6-diamine, 1,8-dichlorocarbazole-3,6-diamine, dimethylsilicondiamine, di-n-butylsilicondiamine, diphenylsilicondiamine, diethoxysilicondiamine, diphenoxysilicondiamine, phenylphosphorusdiamine, methoxyphosphorusdiamine, ethoxyphosphorusdiamine, methylphosphorus oxide diamine, monochloromethyl phosphorus oxide diamine, ethylphosphorus oxide diamine, isopropylphosphorus oxide diamine, benzylphosphorus oxide diamine, phenylphosphorus oxide diamine, butoxyphosphorus oxide diamine, phenoxyphosphorus oxide diamine, 2,2-bis(4-aminophenyl)hexafluoropropane, 2,2-bis(3-amino- 4-methylphenyl)hexafluororopane, 2,2'-bis(trifluoromethyl)benzidine, diaminodiphenylmethane, 4,4'-diamino-2,2'-dimethylorbis(trifluoromethyl)biphenyl,and 1,1-bis[2'-methyl-4'-(p-aminophenoxy)-5'-tert-butylphenyl]butane.

Other examples of organic amines which will form a divalent organic group include, but not limited to, those having the following structural formulas.

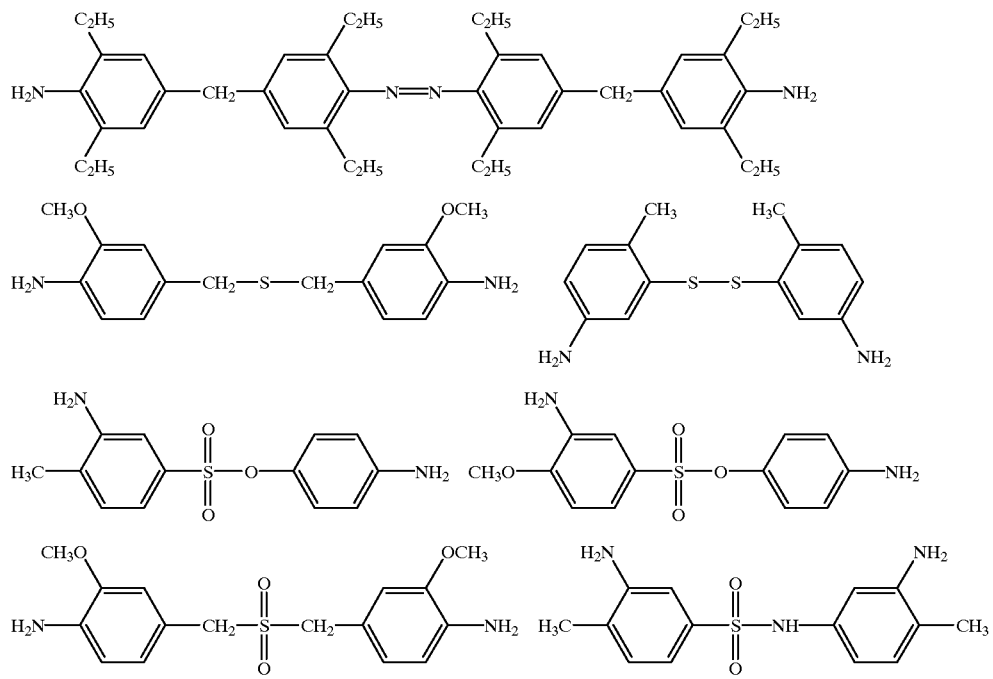

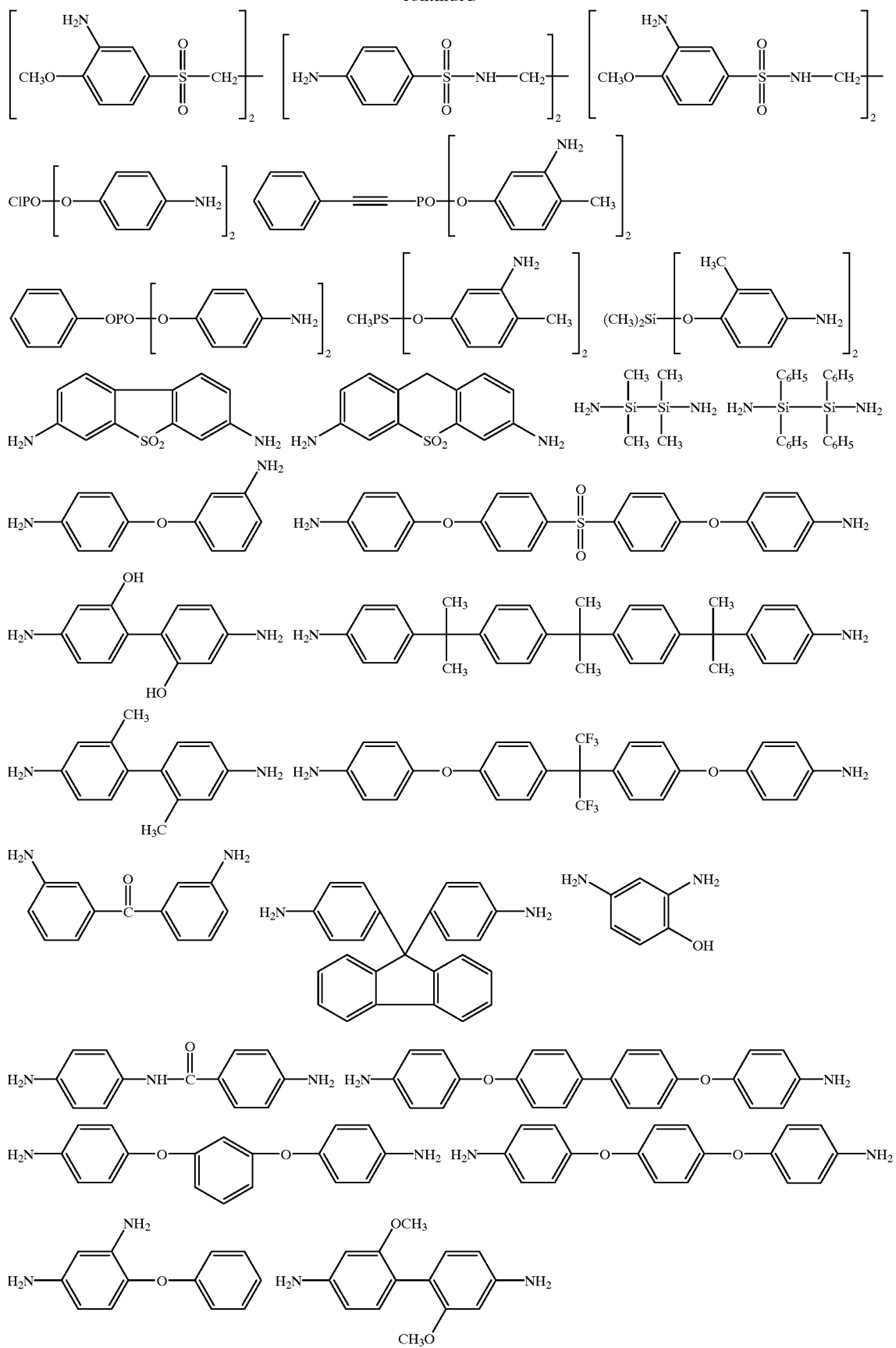

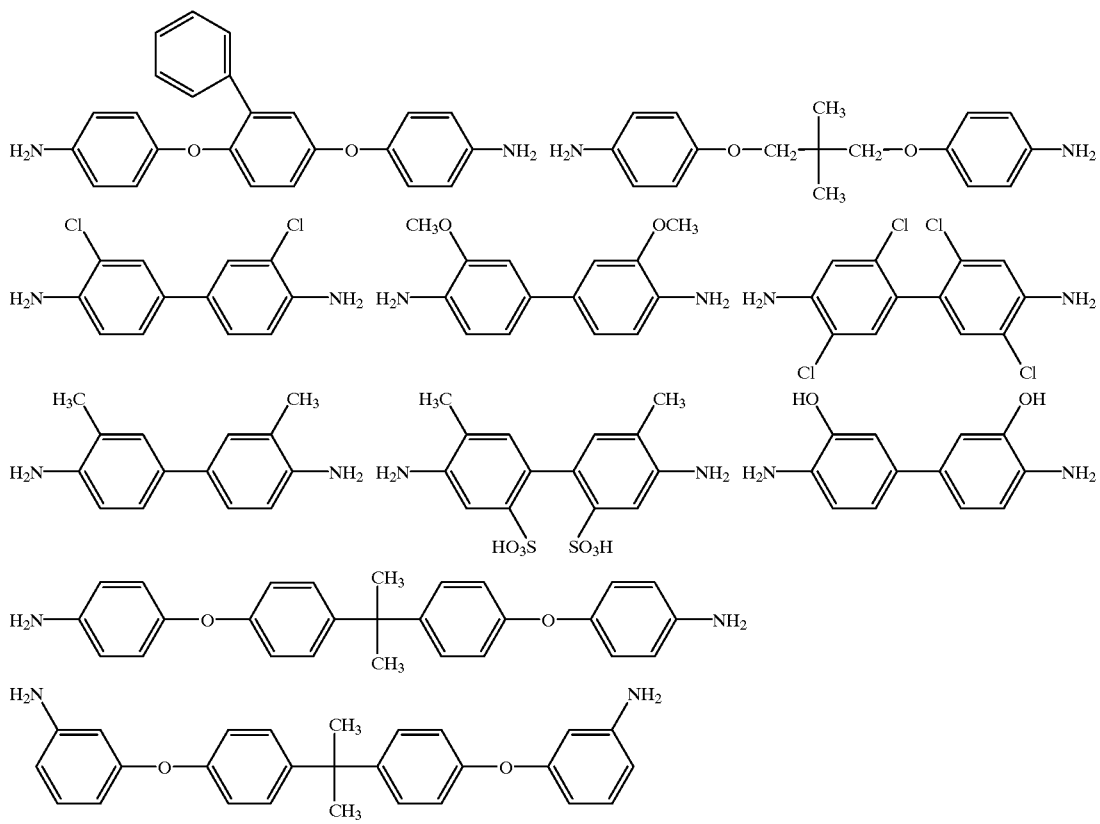

Preparation of Bisurethane from Diamine

In order to prepare a polycarbodiimide from any one of the above-exemplified organic diamines, it is preferred to employ the preparation process of a polycarbodiimide in JP-A-10-158394 (the term "JP-A" as used herein means an unexamined Japanese patent application). In that preparation process, any reaction solvent which can dissolve therein the raw material organic diamine can be used. Examples include THF, diethyl ether, dioxane, acetone, methyl ethyl ketone, ethyl acetate, toluene, xylene, benzene, chloroform and methylene chloride. These solvents may be used either singly or in combination.

A bisurethane compound is prepared by reacting an organic diamine with a halogenated formate. Examples of the halogenated formate to be used in such a reaction include methyl chloroformate, ethyl chloroformate, phenyl chloroformate and p-nitrophenyl chloroformate. The halogenated formate is used in an amount of about 0.5 to 8 mol per mol of the diamine. The reaction temperature is generally from −40 to 110° C., preferably from −20 to 90° C., more preferably from 0 to 80° C. No limitation is imposed on a base which traps hydrogen chloride generated upon the formation of a bisurethane as long as it is soluble in the solvent used and does not impair the reaction. Examples thereof include triethylamine, pyridine and sodium hydroxide. The base is generally used in an amount of 0.1 to 10 mol per mol of the diamine, preferably from 1.0 to 8.0, more preferably from 2.0 to 6.0.

Preparation of Polycarbodiimide

For the preparation of a polycarbodiimide from the bisurethane so obtained, reaction is effected using an organic silicon halide, a basic compound and a polymerization catalyst.

Suitable examples of the organic silicon halide as a reaction catalyst include chlorosilanes such as trimethylchlorosilane, triethylchlorosilane, trimethoxychlorosilane and tetrachlorosilane. Among them, trimethylchlorosilane is most suited from the viewpoints of handling ease and economy. Such a reaction solvent is generally used in an amount of from 0.1 to 10 times the molar weight of a bisurethane to be used, preferably from 0.5 to 7.0 times, more preferably from 1.0 to 4.0 times.

As a basic compound which serves as a neutralizing agent for an acid which is generated upon reaction, tertiary amines such as triethylamine and pyridine are suited. The basic compound is generally used in an amount of from 0.1 to 10 mol per mol of the diamine to be used, preferably from 1.0 to 8.0 times, more preferably from 2.0 to 6.0 times. When the amount of the basic compound is less than 0.1 time, the reaction may not proceed smoothly, while the amount exceeding 10 times may happen to cause undesirable side reaction.

As the polymerization catalyst, any conventionally known carbodiimidizing catalyst can be employed. Examples thereof include phosphorene oxides such as 1-phenyl-2-phosphoren-1-oxide, 3-methyl-2-phosphoren-1-oxide, 1-ethyl- 2-phosphoren-1-oxide, 3-methyl-1-phenylphosphoren-1-oxide and 3-methyl-1-phenyl-2-phosphoren-1-oxide and 3-phosphorene isomers thereof. The polymerization catalyst is generally ased in an amount of 0.05 to 50 mol %, preferably 0.1 to 40 mol %, most suitably 0.5 to 30 mol %, based on the bisurethane.

Such a polymerization catalyst may exist from the beginning of the reaction or alternatively, it may be added after the reaction of the bisurethane with the organic silicon halide compound and basic compound is allowed to proceed in advance. The polymerization reaction is allowed lo proceed generally at a temperature range of from −50 to 200° C., preferably from −10 to 150° C., more preferably from 20 to 120° C. The temperature can be changed as needed according to the combination of the diamine and organic silicon compound to be used.

After the completion of the reaction, the resulting polycarbodiimide resin can be isolated and purified according to any known methods. Specific examples include a process of removing the hydrochloride generated by the reaction and an excess reaction reagent, thereby obtaining a polycarbodiimide resin in the form of a solution; and a process of charging a reaction mixture in a poor solvent such as a lower hydrocarbon or alcohol, thereby obtaining the polymer as a precipitate. After the precipitation, the precipitate is washed and dried in a predetermined manner, whereby the polycarbodiimide resin can be obtained in the solid form.

The thus-obtained polycarbodiimide resin generally has a number-average molecular weight of from 3,800 to 100,000, preferably from 4,000 to 20,000. The use of the resin having an excessively large molecular weight is undesirable from the practical point, since the storage stability is deteriorated and uniform film-forming solution can not be obtained, resulting in difficulty in forming a film. On the other hand, if the molecular weight is too small, the self-supporting properties of a gas separating membrane are formed are deteriorated, and insufficient mechanical strength is caused.

Preparation of Separating Membrane

As a preparation process for the gas separating membrane of the present invention, and the structure and form of the membrane, any conventionally known process, structure and form can be adopted. As the preparation process of the separating membrane, any one of solvent casting, coating, water-surface development, wet spinning and dry spinning can be used. The membrane may be either a symmetric membrane or asymmetric membrane, but latter is preferred for the practical use from the viewpoints of strength, durability and gas selective permeability of the membrane. Examples of such an asymmetric membrane, a so-called heterogeneous membrane which has an active separating layer and a porous substrate layer, both formed of the same material; and a so-called composite membrane which has an active separating layer supported on a porous substrate layer composed of a material different from that of the active separating layer. The membrane may take any form such as flat membrane, tube or hollow fiber. The preparation process, and shape and form of the membrane may be selected as needed according to the materials of the membrane.

Upon preparation of the gas separating membrane according to the present invention, an appropriate preparation process can be adopted according to the structure of the separating membrane such as a symmetric membrane or asymmetric membrane, but a polycarbodiimide membrane is preferred to be prepared by the following process. Upon preparation of a membrane-forming solution of a polycarbodiimide, either one of a solvent used for the polymerization of a polycarbodiimide resin or a solvent which can dissolve the polycarbodiimide resin therein can be used as a solvent. Preferred examples of the solvent include organic solvents such as tetrahydrofuran (THF), diethyl ether, dioxane, acetone, methyl ethyl ketone, ethyl acetate, toluene, xylene, benzene, chloroform, methylene chloride, N-methyl-2-pyrrolidone, N,N-dimethylacetamide, dimethylsulfoxide and N,N-dimethylformamide. Incidentally, for the formation of a sufficiently-thinned, active separating layer of the polycarbodiimide resin, the solution is preferred to have a concentration not higher than 10 wt.%, with not higher than 5 wt.% being more preferred.

When a polycarbodiimide gas separating membrane is formed, for example, in the form of a flat membrane, the membrane-forming solution is coated on a supporting substrate such as a glass substrate by using an applicator, doctor knife, high-speed coater or the like to form a symmetric or asymmetric membrane, followed by peeling off from the glass substrate, whereby a gas separating membrane is formed. Alternatively, the membrane-forming solution is coated on a porous substrate layer, whereby an asymmetric membrane is obtained. The membrane so obtained is heat treated or heat treated under reduced pressure to evaporate the solvent, whereby a gas separating membrane can be formed. Incidentally, the thickness of the active separating layer is preferably 0.03 to 30 $\mu$m from the viewpoints of the mechanical strength of the separating membrane and of maintaining defect-free state of the membrane.

A porous substrate layer to be used as a substrate for a composite membrane is required to have sufficient mechanical strength, heat resistance and chemical resistance from the viewpoints of pressure resistance and durability upon use of the membrane. To obtain a composite membrane having excellent gas permeating performance, it is necessary that homogeneous pores communicating each other can be formed easily. For such a purpose, selection of materials satisfying the above-described properties is very important. As such a polymer, polyamide resins, polyimide resins, polyether sulfone resins and polysulfone resins may be used either singly or in combination. Among them, polysulfone resins and polyimide resins make it possible to easily prepare a porous substrate layer, in the flat, tubular or hollow fiber form, with excellent mechanical strength, heat resistance and durability.

For the formation of the porous substrate layer, a solution of the above-exemplified resin is prepared. Any organic solvent can be used for the preparation of the solution as long as it dissolves therein the resin. Examples include amide solvents such as N-methyl-2-pyrrolidone, N,N-dimethylacetamide and N,N-dimethylformamide, sulfur solvents such as dimethylsulfoxide and sulfolane, halogenated alkyl solvents such as dichloromethane, chloroform, dichloroethane and trichloroethane. At least one of these organic solvents can be used. Water-soluble organic solvents such as N,N-dimethylformamide, N-methyl-2-pyrrolidone and N,N-dimethylacetamide are preferred.

The above-exemplified resin (10 to 50 wt.%) is dissolved in at least one of the above-exemplified solvents. In the case of a flat membrane, the resulting solution is coated on a glass plate, nonwoven cloth or woven cloth, followed by immersion in a solidifying liquid such as water, a lower alcohol or a ketone, or a mixed solution of at least two thereof. The membrane so solidified is dried under heat, whereby a supporting membrane having a porous substrate layer is prepared. The membrane in the tubular or hollow fiber form is, on the other hand, prepared in a similar manner by using a tubular extrusion nozzle or hollow fiber cyclic nozzle. It is preferred that the porous substrate layer has a surface pore diameter of 5 to 500 nm and a porosity 30 to 80%.

The gas separating membrane according to the present invention which has a polycarbodiimide resin layer has excellent heat resistance, chemical resistance and durability, can be used as a gas separating membrane in various fields, and has gas permeating performance and selective separativity by far superior to those of the conventional heat-resistant high-molecular materials.

EXAMPLES

The present invention will hereinafter be described more specifically by examples and comparative examples, but it should however be borne in mind that the present invention is not limited to or by these examples.

EXAMPLE 1

Preparation of Polycarbodiimide

In a three-necked 1-liter flask equipped with a dropping funnel, 40.0 g (77.2 mmol) of 2,2-bis(4-aminophenoxyphenyl)hexafluoropropane, 530 g of methylene chloride and 34.4 g (339 mmol) of triethylamine were charged. In the dropping funnel, 24.2 g (154 mmol) of phenyl chloroformate were charged and the reaction vessel was cooled to 0° C. over an ice bath. The phenyl chloroformate was added dropwise over 15 minutes, followed by stirring overnight while returning the temperature to room temperature. The flask was then installed with a condenser having a calcium chloride tube attached thereto. In the flask, 0.104 g (0.540 mmol, 0.70 mol %) of a carbodiimidization catalyst (3-methyl- 1-phenylphosphorenloxide) was charged and the flask was purged with an argon gas. At room temperature, 18.4 g (170 mmol) of trimethylchlorosilane were charged and stirred for 10 minutes. After raising the reaction temperature from room temperature to 80° C. over 2 hours while replacing the methylene chloride with an equal amount of toluene, stirring was effected at 80° C. for 4 hours. After the completion of carbodiimidization was confirmed by IR, 20.5 g (154 mmol) of m-tolyl isocyanate were charged, followed by heating for 1.5 hours at 80° C.

The reaction mixture was charged in 3160 g of methanol under stirring. The precipitates so obtained were collected and dried under reduced pressure. The carbodiimide so obtained in the form of white powders was soluble in an organic solvent and its yield was 36. Og (yield: 90%). Its molecular weight was measured using "HLC 8120" (trade name; product of TOSOH Corporation), resulting in Mn of 8,400 and Mw of 26,000 in terms of the molecular weight of the standard polystyrene.

Preparation of Gas Separating Membrane

The polycarbodiimide resin so obtained was adjusted to be a 20 wt.% solution with THF and then passed through a stainless filter having a pore size of 5 μm, followed by degassing under reduced pressure. The resulting solution was cast on a glass plate. The solvent was removed at 90° C. for 20 minutes and at 150° C. for 20 minutes, followed by drying at 200° C. for 20 minutes. The membrane available by peeling from the glass plate was a homogeneous dense membrane having a thickness of 27 μm. The permeability of each of nitrogen, carbon dioxide, oxygen and methane gases through the resulting membrane was measured at 25° C. and a pressure difference of 2.94 atom. As a result, the permeability of a nitrogen gas was $0.381 \times 10^{-10}$ $cm^3(STP)cmcm^{-2}sec^{-1}cmHg^{-1}$, that of a carbon dioxide gas was $7.92 \times 10^{-10}$ $cm^3(STP)cmcm^{-2}sec^{-1}cmHg^{-1}$, that of an oxygen gas was $1.95 \times 10^{-10}$ $cm^3(STP)cmcm^{-2}sec^{-1}cmHg^{-1}$ and that of a methane gas was $0.327 \times 10^{-10}$ $cm^3(STP)cmcm^{-2}sec^{-1}cmHg^{-1}$. The oxygen/nitrogen separation factor was 5.11, while the carbon dioxide/nitrogen separation factor was 20.8.

EXAMPLE 2

Preparation of Gas Separating Composite Membrane

In dimethylacetamide, 25 wt.% of polysulfone ("Udel P-1700", trade name) were dissolved. The resulting solution was filtered thorough a stainless filter having a pore size of 5 μm, followed by degassing under reduced pressure. The resulting solution was cast on a glass substrate and then solidified by immersing it in a 70:30 (wt.%) mixed solvent of water and isopropyl alcohol adjusted to 50° C. The membrane so solidified was peeled off from the glass plate and dried under heat, whereby a porous supporting membrane having a thickness of 150 μm was obtained. After the polycarbodiimide resin obtained in Example 1 was adjusted to a 1 wt.% solution with THF, the resulting solution was passed through a stainless filter having a pore size of 5 μm, followed by degassing under reduced pressure. The resulting solution was coated on the supporting membrane by an applicator, followed by drying at 90° C. for 20 minutes and at 150° C. for 20 minutes, whereby a composite membrane comprising an active separating layer formed of a polycarbodiimide resin and a porous substrate layer of polysulfone was obtained.

As a result of measuring the permeability of each gas as in Example 1, the permeable speed of a nitrogen gas was $0.444 \times 10^{-5}$ $cm^3(STP)cm^{-2}sec^{-1}cmHg^{-1}$, that of a carbon dioxide gas was $8.93 \times 10^{-5}$ $cm^3(STP)cm^{-2}sec^{-1}cmHg^{-1}$ and that of an oxygen gas was $2.18 \times 10^5$ $cm^3(STP)cm^{-2}sec^{-1}cmHg^{-1}$. The oxygen/nitrogen separation factor was 4.9, while the carbon dioxide/nitrogen separation factor was 20.1.

EXAMPLE 3

In a similar manner to Example 1 except for the use of 9,9'-bis(4-aminophenyl)fluorene as a diamine, a polycarbodiimide resin was synthesized. As a result, a polymer was obtained in the form of pale yellow powders in a yield of 85%. The polycarbodiimide resin so synthesized had an Mn of 8,700 and Mw of 29,000. As in Example 1, a homogeneous gas separating membrane was formed and the permeability of each gas was measured. As a result, the permeability of a nitrogen gas was $0.134 \times 10^{-10}$ $cm^3(STP)cmcm^{-2}sec^{-1}cmHg^{-1}$, that of a carbon dioxide gas was $2.58 \times 10^{-10}$ $cm^3(STP)cmcm^{-2}sec^{-1}cmHg^{-1}$ and that of an oxygen gas was $0.659 \times 10^{-10}$ $cm^3(STP)cmcm^{-2}sec^{-1}cmHg^{-1}$. The oxygen/nitrogen separation factor was 4.93, while the carbon dioxide/nitrogen separation factor was 19.3.

EXAMPLE 4

On a polysulfone porous substrate layer obtained in Example 2, the polycarbodiimide resin obtained in Example 3 was coated thin, whereby a gas separating composite membrane was obtained. Its permeability of each gas was measured in the same manner as in Example 1. As a result, the permeable speed of a nitrogen gas was $0.247 \times 10^{-5}$ $cm^3(STP)cm^{-2}sec^{-1}cmHg^{-1}$, that of a carbon dioxide gas was $4.67 \times 10^{-5}$ $cm^3(STP)cm^{-2}sec^{-1}cmHg^{-1}$ and that of an oxygen gas was $1.19 \times 10^{-5}$ $cm^3(STP)cm^{-2}sec^{-1}cmHg^{-1}$. The oxygen/nitrogen separation factor was 4.8, while the carbon dioxide/nitrogen separation factor was 18.9.

EXAMPLE 5

A polycarbodiimide resin was synthesized in the same manner as in Example 1 except for using 1,1-bis[2'-methyl- 4'-(p-aminophenoxy)-5'-tert-butylphenyl]butane as a diamine. As a result, pale white powders were obtained in a yield of 82%. The polycarbodiimide resin so obtained had an Mn of 8,700 and Mw of 29,000. A homogeneous gas separating membrane was formed and its permeability of each gas was measured in the same manner as in Example 1. As a result, the permeability of a nitrogen gas was $1.81 \times 10^{-10}$ cm$^3$(STP)cmcm$^{-2}$sec$^{-1}$cmHg$^{-1}$, that of a carbon dioxide gas was $36.6 \times 10^{-10}$ cm$^3$(STP)cmcm$^{-2}$sec$^{-1}$cmHg$^{-1}$ and that of an oxygen gas was $9.46 \times 10^{-10}$ cm$^3$(STP)cmcm$^{-2}$sec$^{-1}$cmHg$^{-1}$. The oxygen/nitrogen separation factor was 3.82, while the carbon dioxide/nitrogen separation factor was 20.2.

COMPARATIVE EXAMPLE 1

In a 1-liter four-necked flask equipped with a dropping funnel, 52.2 g (300 mmol) of 2,4-tolylene diisocyanate and 400 g of chlorobenzene were charged. To the resulting mixture, 0.104 g (0.540 mmol) of (3-methyl-1-phenylphosphoren-1-oxide) was added as a carbodiimidizing catalyst and the flask was purged with an argon gas. After raising the reaction temperature from room temperature to 80° C. over one hour, the reaction was effected at 80° C. for 5 hours. The reaction mixture was poured in 4000 g of methanol while stirring The precipitates were collected and dried under reduced pressure. The carbodiimide resin obtained in the form of pale yellow powders was soluble in an organic solvent and its yield was 31.2 g (yield: 80%). Concerning the molecular weight, it had an Mn of 3,800 and Mw of 11,200. As in Example 1, a homogeneous gas separating membrane was formed but it was too fragile for the measurement.

The gas separating membrane according to the present invention has excellent gas selective permeability. Furthermore, a practically usable membrane can be obtained by the formation of a composite membrane from a thin active separating layer composed of the polycarbodiimide resin of the present invention and a porous substrate layer composed of another heat-resistant resin.

While the invention has been described in detail and with reference to specific embodiments thereof, it will be apparent to one skilled in the art that various changes and modifications can be made therein without departing from the spirit and scope thereof.

What is claimed is:

1. A gas separating membrane comprising a layer composed of a polycarbodiimide resin which has repeating units represented by formula (I):

(I)

wherein R represents a divalent organic group formed from an organic diamine.

2. The gas separating membrane of claim 1, which is a composite membrane comprising:

(1) an active separating layer of a polycarbodiimide resin which has repeating units represented by formula (I):

(I)

wherein R represents a divalent organic group and (2) a porous substrate layer.

3. The gas separating membrane of claim 2, wherein said porous substrate layer is formed of a polyamide resin, polyimide resin, polyether sulfone resin or polysulfone resin.

4. The gas separating membrane of claim 1, wherein the polycarbodiimide resin has a number-average molecular weight of 3,800 to 100,000.

5. The gas separating membrane of claim 1, wherein the polycarbodiimide resin is one prepared by using a bisurethane as a raw material together with an organic silicon halide, a basic compound and a polymerization catalyst.

* * * * *